J. T. LOCKHART.
HUMIDIFIER.
APPLICATION FILED MAR. 10, 1911.

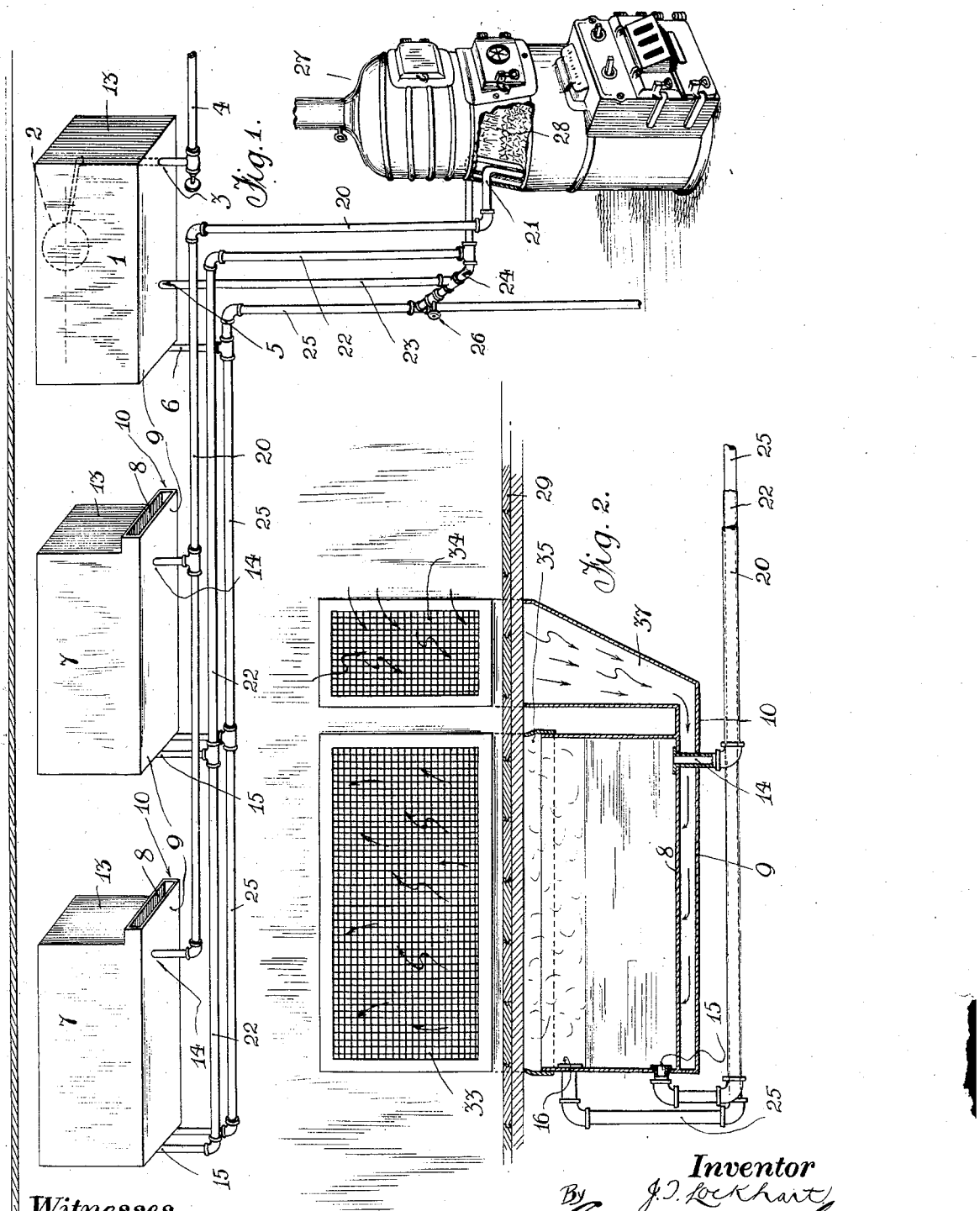

1,005,723.

Patented Oct. 10, 1911.
3 SHEETS—SHEET 2.

Witnesses

Inventor

J. T. LOCKHART.
HUMIDIFIER.
APPLICATION FILED MAR. 10, 1911.

1,005,723.

Patented Oct. 10, 1911.

3 SHEETS—SHEET 3.

Witnesses

Inventor
By J. T. Lockhart
Atty 1,005,723. HUMIDIFIER. JOHN THOMAS LOCKHART, Westmount, Quebec, Canada. Filed Mar. 10, 1911. Serial No. 613,544.

*To all whom it may concern:*

Be it known that I, JOHN THOMAS LOCKHART, resident of 375 Metcalfe avenue, in the city of Westmount, Province of Quebec, Dominion of Canada, a subject of the King of Great Britain, have invented certain new and useful Improvements in Humidifiers; and I do hereby declare that the following is a full, clear, and exact description of the same.

The invention relates to improvements in humidifiers, as described in the present specification and illustrated in the accompanying drawings that form part of the same.

The invention consists essentially in the novel construction and arrangement of parts, whereby the dry condition of the atmosphere in chambers, corridors and other heated places, is relieved by moisture exuded from water receptacles connected by piping to a heating member.

The objects of the invention are to provide moisture in the atmosphere in living rooms and places, to devise a means of circulation of the air of the apartment, and generally to furnish an automatic system of humidifying the atmosphere in buildings of simple, cheap and durable construction.

Figure 3:
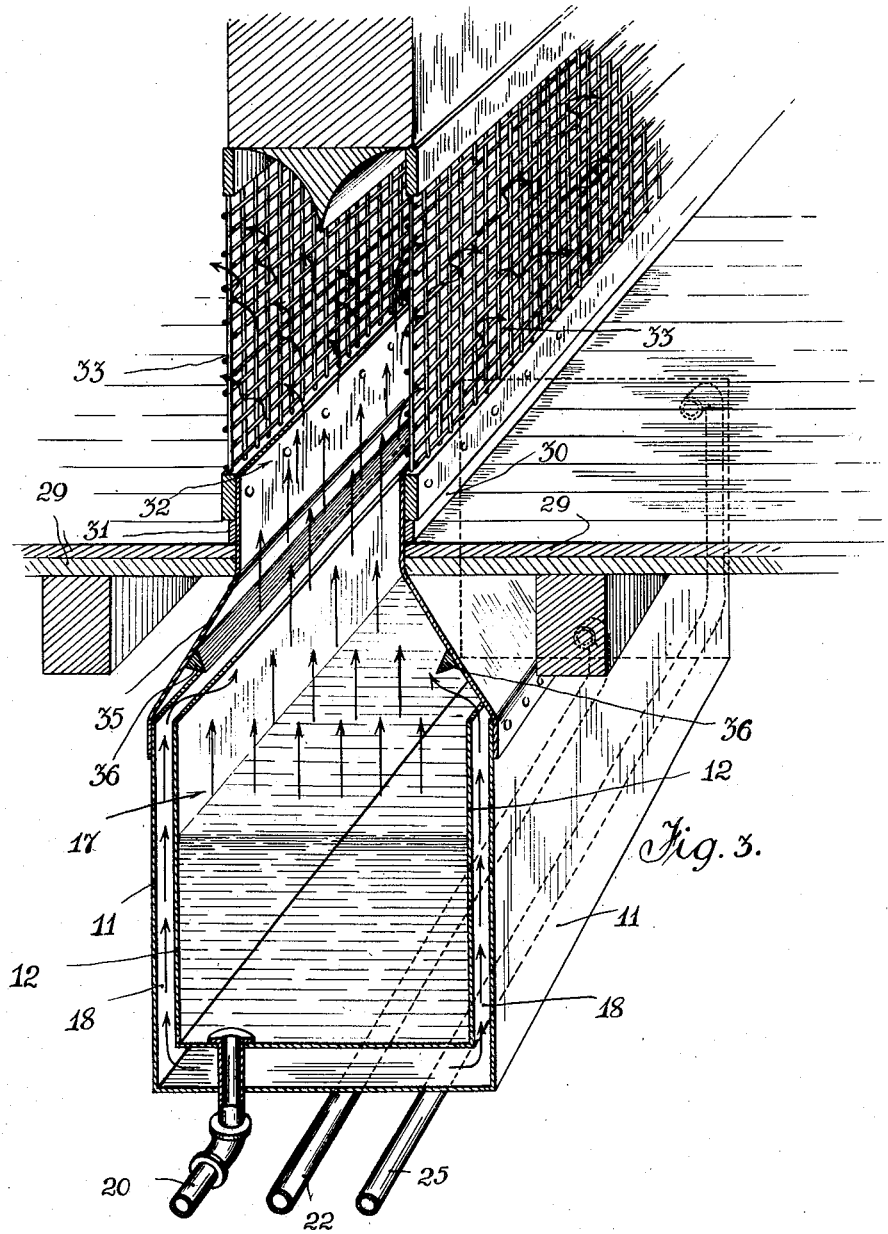
Figure 4:
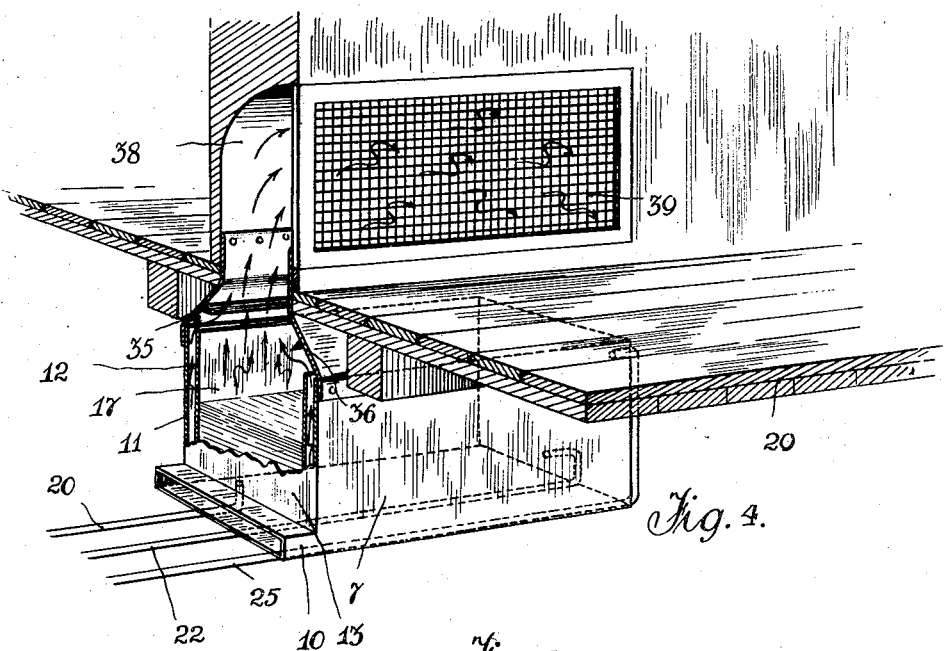
Figure 5:
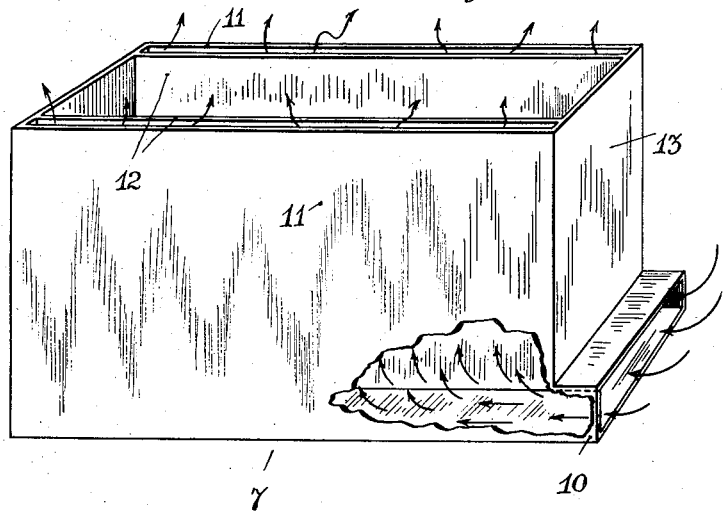

In the drawings, Figure 1 is a diagrammatic view, showing a plurality of tanks and their connections to a heater. Fig. 2 is a longitudinal sectional view of a water receptacle within the partition walls, showing the wall gratings forming the passages for the flow of the moist air into the room and the flow of the dry and spent air therefrom. Fig. 3 is a cross sectional view, in perspective, of a water receptacle, showing the flooring thereabove, the walls of the partition and the gratings in the walls. Fig. 4 is a sectional perspective view of a water receptacle, the flooring thereabove, partition walls above said flooring and single grating forming the passage for the moisture into a single apartment. Fig. 5 is a perspective detail of a water receptacle partly broken away in one of its sides.

Like numerals of reference indicate corresponding parts in each figure.

Referring to the drawings, 1 is the regulating water receptacle having in the interior thereof any suitable form of inlet valve operated by the float 2 in precisely the same manner as in any flushing cistern, said receptacle having the inlet 3 connected with the main water supply by the pipe 4 and the outlet 5 in the bottom thereof.

6 is an overflow pipe from a suitable overflow outlet in the receptacle 1.

7 are water receptacles here shown as of rectangular box form and comparatively shallow, though it must be understood they may be of any size or shape, said receptacles having the inner and outer bottoms 8 and 9 respectively, projecting outwardly at one end in the spout form 10, the double sides 11 and 12 suitably spaced apart, the outer sides 11 closing in the sides of the spout extension 10 of the bottoms 8 and 9, and the ends 13, said ends extending completely across between the outer sides 11 and joined to the ends of the inner sides 12 and to the inner bottom 8, said receptacles also having the inlet openings 14, the return outlet openings 15 and the overflow outlet openings 16. It will be thus seen that each receptacle 7 has the interior water compartment 17 flanked by the air passages 18, said air passages communicating with the air passage between the bottoms 8 and 9 and the spout opening 10.

20 is the main inlet pipe leading to the inlet openings 14 of the water receptacle 7 from the heating coil 21.

22 is the main return pipe leading from the return outlets 15 to the coil 21.

23 is a pipe leading from the outlet 5 of the receptacle 1 to the pipe 24, said pipe 24 being connected and communicating with the coil 21, said pipes 23 and 24 forming the feed pipes for keeping the heating coil 21 automatically supplied with water, consequently, as the regulating receptacle 1 is constantly supplied with water by means of the supply pipe 4 and the coil 21 supplied with water through the pipes 23 and 24, the receptacles 7 must also be constantly supplied with water, as the coil 21 is connected with said receptacles by the inlet pipe 20 and the return pipe 22, therefore, there is an uninterrupted circulation of water through said receptacles as well as a means for governing the water level in each of said receptacles 7, said means being the float operated inlet valve in the regulating tank 1.

25 is an overflow pipe from the overflow outlets 16 from the receptacles 7, connected with the overflow pipe 6 from the receptacle 1 and connected with the pipe 24 and extending beyond said pipe to the drain.

26 is a turn-cock in the pipe 24 between the pipe 25 and the pipe 23, thus the water which rises beyond its proper level will pour through the overflow outlets into the overflow pipe 25 and flow down to the drain, further by opening the cock 26, the whole system may be emptied and if desired thoroughly flushed.

27 is a heater, having the fire box 28, into which the coil 21 extends, thereby keeping the water that is circulating in each receptacle 7 in a constant heated condition, so much so as to cause said water to boil in the receptacles 7 and thus generate steam for humidifying the atmosphere.

The system of humidifying the atmosphere has now been explained, but its application is extremely important and will now be described.

29 are floorings terminating at the walls 30 and 31 of the partition 32, said walls having openings adjacent to said floors covered by the gratings 33 and 34, the gratings 33 forming steam egress passages and the gratings 34 forming dry air ingress passages.

35 is a bell at its upper end rigidly secured to the flooring 29 or the base above said flooring and at its lower end secured to the outer walls 11 of the receptacle 7, said bell having in the flaring portion thereof, the baffle strips 36 for preventing a condensation drip entering the air passages 18.

37 is a hopper chamber at its lower end connected to the spout opening 10 and at its upper end open to the flow of air through the gratings 34, said hopper chamber below said flooring 29 being preferably adjacent to one end of the receptacle 7. These receptacles 7 are similarly placed in various parts of a house, either in the rooms, corridors or other places.

In Fig. 4, the arrangement is shown for a corridor not immediately adjoining a room, in which the passage is single, and in this arrangement an arch-shaped passage 38 is formed within the partition from the receptacle 7, leading to the single grating 39.

In the use of this invention, the water is heated by means of the heating coil 21 to boiling point and circulated throughout the receptacles 7, the proper level being regulated by the float 2 and the regulating receptacle 1. This boiling water is in constant circulation, therefore, the steam generated rises and passes through the gratings 33 or 39 into the particular apartment and there rises and spreads throughout the room and imparts to the atmosphere the correct humidity for a living room. The spent and dry air, which is constantly being made in a heated room, is, to a great extent, blanketed by the properly moistened air and eventually driven through the gratings 34 into the hopper chambers 37, flowing from said hopper chambers 37 through the passages 19 and 18 and in turn driving the moist air ascending from the receptacle 7 through the gratings 33 and naturally receiving its share of moisture in mixing with said air, in fact constituting a perfect circulation of air, thereby keeping the atmosphere in the apartment, not only in the proper state of humidity, but in a constantly fresh and clean condition.

The exact form of heater is not essential to this invention, nor the exact form of heating coils, as any form of water heater may be used and any form of connections, the preferable plan of the piping is shown, but it will be understood that under some circumstances this will be changed to meet the existing conditions, furthermore, many of the details of construction and arrangement may be modified so long as the scope of the invention, as pointed out in the claims is not departed from.

What I claim as my invention is:

1. In a humidifier, the combination with the heater having a suitable water heating device, of a plurality of water receptacles having inlets and outlets, a cistern having a main water inlet and an outlet, an inlet pipe from said heating device to said receptacles, a return pipe from the outlets of said receptacles to said heating device, a feed pipe from the outlet of said cistern to said heating device, and an overflow pipe from said receptacles and said cistern and leading to the drain.

2. In a humidifier, the combination with a heater having a suitable water heating device, of a plurality of water receptacles having inlets and outlets, a cistern having an inlet and outlets, a main water supply pipe connected to said inlet of the cistern, a float operated valve controlling the main water inlet to said cistern, pipes connecting the inlets of said water receptacles to said heating device, pipes connecting the return water outlets of said receptacles to said heating device, pipes connecting the overflow outlets of said water receptacles and the overflow outlet of said cistern to the drain, a feed pipe from the outlet of said cistern, a pipe connecting said drain pipe, said feed pipe and said return pipe at its connection to said heating device, and a turn cock in said connecting pipe between said feed pipe and said drain pipe.

3. In a humidifier, the combination with a water heater, of a plurality of water receptacles having double side walls forming air passages and inlets to said passages from the ends of the receptacles and suitable inlets to and outlets from the water compartment between said double side walls, a system of flow and return water piping to and from said water heater and water compartment inlets and outlets, and a cistern regulating the feed of water into said heater and the level of the water in the water receptacles.

4. In a humidifier, the combination with a water heater, of a plurality of tanks, each of said tanks having a double bottom and double side walls, said double bottom forming an air passage to the air passages formed by said double sides and an inlet to and outlets from the water compartment within the inner walls, a system of piping connecting the water of said receptacles with the heater, and a cistern regulating, the feed of water into said heater and connected thereto, and the level of the water in said receptacles.

5. In a device of the class described, in combination, a water receptacle having inner sides, inner bottom and ends forming in the interior thereof a water compartment and outer sides and outer bottom with the aforesaid inner bottom forming a lateral spout extension at one end thereof leading to air passages between said bottoms and walls, means connected with said spout extension for directing air into said passages, and means for feeding hot water into said compartment.

6. In a device of the class described, a water receptacle having hollow walls and bottom forming air passages and securely supported within an apartment partition, a hopper chamber within the apartment partition connected with said passages formed of hollow walls and bottom, gratings in the partition walls above said receptacle and said hopper chamber respectively, means for supplying water to said receptacle, and means for heating said water.

7. In a device of the class described, in combination, a water receptacle having hollow sides and bottom, a bell secured at the upper ends and leading into a space between partition walls and at its lower end rigidly secured to the outer walls on said receptacle and having condensation drip water baffle strips secured thereto intermediate of the depth of the flaring portions, gratings secured in suitable openings in said partition walls and forming moistened air passages, a water heater, a system of water piping connecting said receptacle to said water heater, gratings forming passages for dry air through openings in said partition walls, a hopper chamber secured below said dry air gratings and connected with the passage formed in the hollow bottom of said receptacle, and a cistern governing the supply of water to said heater and regulating the level of water in said water receptacle.

Signed at the city and district of Montreal, Quebec, Canada, this eighth day of March, 1911.

JOHN THOMAS LOCKHART.

Witnesses:
G. H. TRESIDDER,
P. SHEE.